US008933921B2

(12) United States Patent
Zhao et al.

(10) Patent No.: US 8,933,921 B2
(45) Date of Patent: Jan. 13, 2015

(54) ADJUSTMENT METHOD OF LCD OVERDRIVE VOLTAGE AND DEVICE THEREOF

(75) Inventors: Dengxia Zhao, Shenzhen (CN); Poshen Lin, Shenzhen (CN)

(73) Assignee: Shenzhen China Star Optoelectronics Technology Co., Ltd., Shenzhen, Guangdong Province (CN)

(*) Notice: Subject to any disclaimer, the term of this patent is extended or adjusted under 35 U.S.C. 154(b) by 221 days.

(21) Appl. No.: 13/219,673

(22) Filed: Aug. 27, 2011

(65) Prior Publication Data

US 2012/0105422 A1 May 3, 2012

(30) Foreign Application Priority Data

Nov. 1, 2010 (CN) .......................... 2010 1 0527426

(51) Int. Cl.
*G06F 3/038* (2013.01)
*G09G 3/36* (2006.01)

(52) U.S. Cl.
CPC ................ *G09G 3/36* (2013.01); *G09G 3/3648* (2013.01); *G09G 2320/0252* (2013.01); *G09G 2320/041* (2013.01); *G09G 2340/16* (2013.01)
USPC ........................................... 345/212; 330/289

(58) Field of Classification Search
USPC ........................ 345/38, 50, 87, 102, 204–215
See application file for complete search history.

(56) References Cited

U.S. PATENT DOCUMENTS 4,037,931 A * 7/1977 Ido et al. ........................ 345/101
6,680,985 B1 * 1/2004 Strodtbeck et al. ........... 375/320
2005/0093812 A1 * 5/2005 Lee et al. ...................... 345/101
2005/0151712 A1 * 7/2005 Pai .................................. 345/98
2005/0168286 A1 * 8/2005 Kokubo ......................... 330/289
2008/0284775 A1 * 11/2008 Shen et al. ..................... 345/214
2009/0121999 A1 * 5/2009 Yang ............................. 345/101
2009/0267888 A1 10/2009 Lo
2009/0315918 A1 * 12/2009 Minami et al. ................ 345/690
2011/0210878 A1 * 9/2011 Barrow ......................... 341/135
2011/0298746 A1 * 12/2011 Hotelling ...................... 345/174

FOREIGN PATENT DOCUMENTS

CN 1747172 A 3/2006
CN 101206827 A 6/2008
CN 101266764 A 9/2008
CN 101324715 A 12/2008
JP 2010008882 A 1/2010

* cited by examiner

*Primary Examiner* — Abbas Abdulselam
*Assistant Examiner* — Gerald Oliver
(74) *Attorney, Agent, or Firm* — Cheng-Ju Chiang

(57) ABSTRACT

Disclosed are an adjustment method of an LCD (Liquid Crystal Display) overdrive voltage and the device. The adjustment method comprises steps below: locating a transistor at a position capable of sensing a temperature of an LCD panel; providing a constant current source to a drain of the transistor and a conducting voltage to the transistor, and a voltage difference between a source and a gate changing according to a temperature changing of the LCD panel; receiving voltages of the source and the gate of the transistor to calculate a voltage difference therebetween and outputting an amplified value of the voltage difference by an error amplifier; receiving the amplified value of the voltage difference and outputting corresponding binary signals by an analog to digital converter; providing a selector storing a plurality of overdrive voltages for selecting different overdrive voltages according to the different binary signals to adjust the LCD overdrive voltage.

19 Claims, 2 Drawing Sheets

ADJUSTMENT METHOD OF LCD OVERDRIVE VOLTAGE AND DEVICE THEREOF

BACKGROUND OF THE INVENTION

1. Field of the Invention

The present invention generally relates to an LCD (Liquid Crystal Display) manufacture field, and more particularly to an adjustment method of LCD overdrive voltage and device thereof.

2. Description of Prior Art

The viscosity factor of the liquid crystal changes each time as a rise or a decrease occurs in the temperature of the LCD panel. Accordingly, the response speed of the liquid crystal also changes. For improving the response speed problem, many solutions have been proposed in prior arts. One of the solutions is to adjust the overdrive voltage of the liquid crystal in accordance with the temperature change to neutralize the response speed change of the liquid crystal. However, the temperature of the LCD panel has to be confirmed for adjusting the overdrive voltage accurately. It is a burning question in prior arts that how to obtain the temperature of the LCD panel accurately in real time.

Accordingly, what is needed is an adjustment method of LCD overdrive voltage and device thereof for rapidly and accurately sensing the temperature of the LCD panel and controlling the LCD overdrive voltage according to the temperature hereby.

SUMMARY OF THE INVENTION

An exemplary adjustment method of LCD (Liquid Crystal Display) overdrive voltage comprises steps below: locating a transistor at a position capable of sensing a temperature of an LCD panel; providing a constant current source to a drain of the transistor and a conducting voltage to the transistor, and a voltage difference between a source and a gate changing according to a temperature changing of the LCD panel; receiving voltages of the source and the gate of the transistor to calculate a voltage difference therebetween and outputting an amplified value of the voltage difference by an error amplifier; receiving the amplified value of the voltage difference and outputting corresponding binary signals by an analog to digital converter; providing a selector storing a plurality of overdrive voltages for selecting different overdrive voltages according to the different binary signals to adjust the LCD overdrive voltage.

An exemplary adjustment device of LCD overdrive voltage comprising a transistor, a analog to digital converter, an error calculator and a selector storing a plurality of overdrive voltages. The transistor is located on an LCD panel, and a voltage difference between a source and a gate of the transistor changes according to a temperature change of the LCD panel. The error calculator receives voltages of the source and the gate of the transistor and outputs a voltage difference thereof. The analog to digital converter receives the voltage difference and outputs corresponding binary signals. The selector selects a corresponding overdrive voltage according to the binary signals to adjust the LCD overdrive voltage.

An exemplary adjustment method of LCD overdrive voltage comprises steps below: locating a transistor on an LCD panel; applying a voltage difference between a source and a gate of the transistor to change according to the temperature change of the LCD panel; receiving voltages of the source and the gate of the transistor and outputting a voltage difference thereof by an error calculator; receiving the voltage difference and outputting corresponding binary signals by an analog to digital converter; providing a selector storing a plurality of overdrive voltages, selecting a corresponding overdrive voltage according to the binary signals to adjust the LCD overdrive voltage.

Other novel features and advantages will become more apparent from the following detailed description when taken in conjunction with the accompanying drawings. In the drawings, all the views are schematic.

DETAILED DESCRIPTION OF THE INVENTION

Reference will now be made to the drawings to describe the present invention in detail. For a better understanding the objective, characteristics and benefits of the present invention, preferable embodiments are illustrated in accordance with the attached figures for further explanation. The specification of the present invention provides kinds of embodiments to explain the technical characteristics of the different implementations of the present invention. The locations of the respective elements in the embodiments are for clearly explaining the content of the present invention but not limitations thereto. Same grades used for indicating elements in the different embodiments are simplifying the explanation but not mentioning the relevance between the different embodiments.

Figure 1:
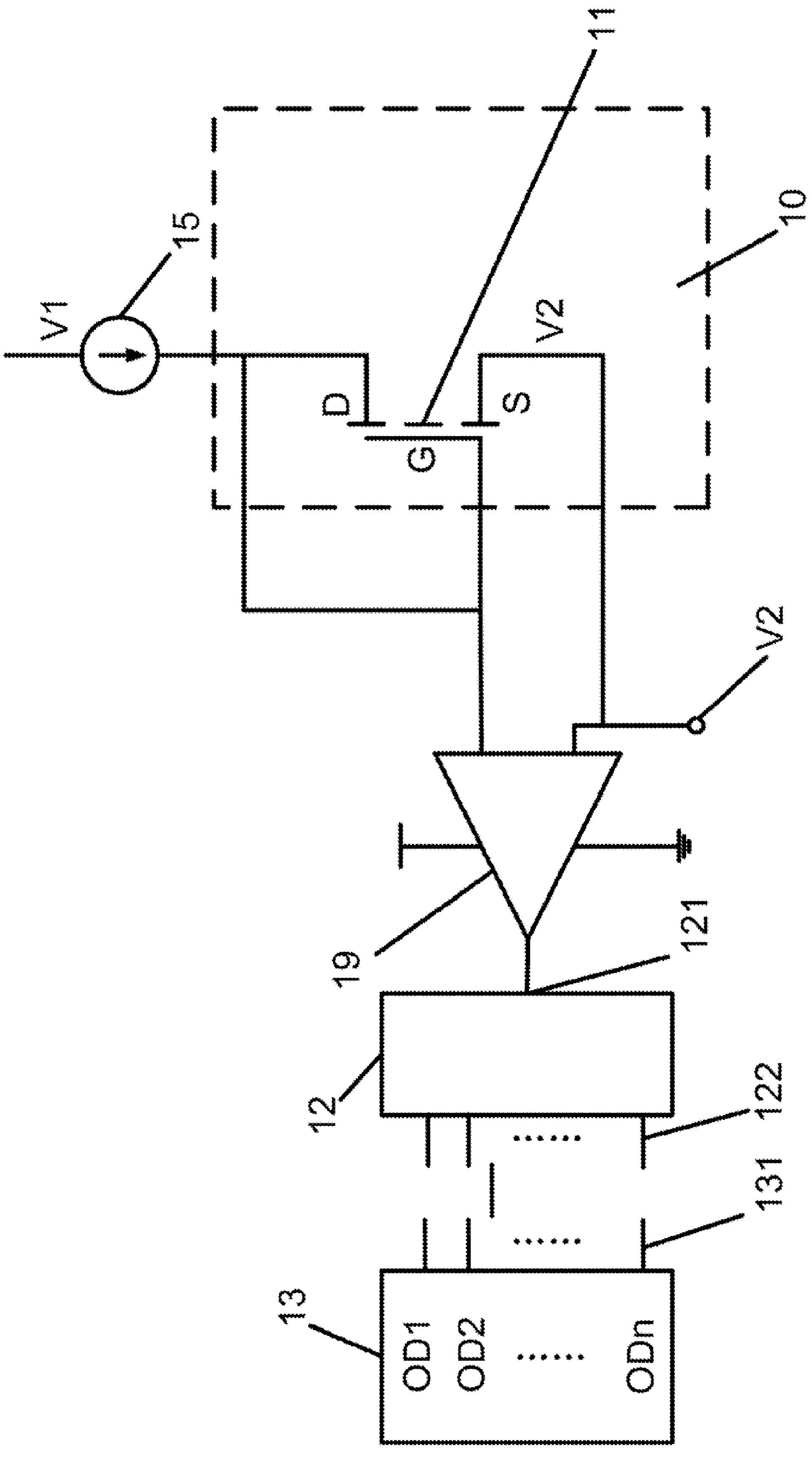
FIG. 1 shows a diagram of a structure of an adjustment device of an LCD overdrive voltage according to a preferable embodiment of the present invention.

FIG. 1 shows a diagram of a structure of an adjustment device of an LCD (Liquid Crystal Display) overdrive voltage according to the embodiment of the present invention. The adjustment device comprises a constant current source 15, a thin film transistor 11, an analog to digital converter 12, a selector 13 and an error amplifier 19. The thin film transistor 11 is located on a LCD panel 10. A drain D of the thin film transistor 11 receives a predetermined voltage V1 via the constant current source 15. The foregoing predetermined voltage V1 can come from a driving IC of the LCD. A gate G of the thin film transistor 11 is electrically connected to the drain D and also connected to a variable voltage input end (not indicated) of the error amplifier 19. A source S of the thin film transistor 11 is electrically connected to a reference voltage input end (not indicated) of the error amplifier 19. The foregoing source S receives a reference voltage V2. The reference voltage V2 can come from the driving IC of the LCD and can be a common voltage of the LCD. A voltage output end (not indicated) of the error amplifier 19 is electrically connected to an analog voltage input end 121 of the analog to digital converter 12. A plurality of binary signal output ends of analog to digital converter 12 is electrically connected to a plurality of input ends of the selector 12.

The selector 13 stores a plurality of overdrive voltages (OD1, OD2, . . . , ODn). The overdrive is that the LCD is driven by different overdrive voltages OD1, OD2, . . . , ODn according to different response times of the LCD to obtain an ideal display effect. Because the effect of the temperature to the LCD also needs to be adjusted by the overdrive voltage, different overdrive voltages should be utilized under different temperature conditions.

The foregoing thin film transistor 11 can be either a N-type thin film transistor or a P-type thin film transistor, as long as a relation between the predetermined voltage V1 and the reference voltage V2 satisfies a conducting condition of the thin film transistor 11.

Figure 2:
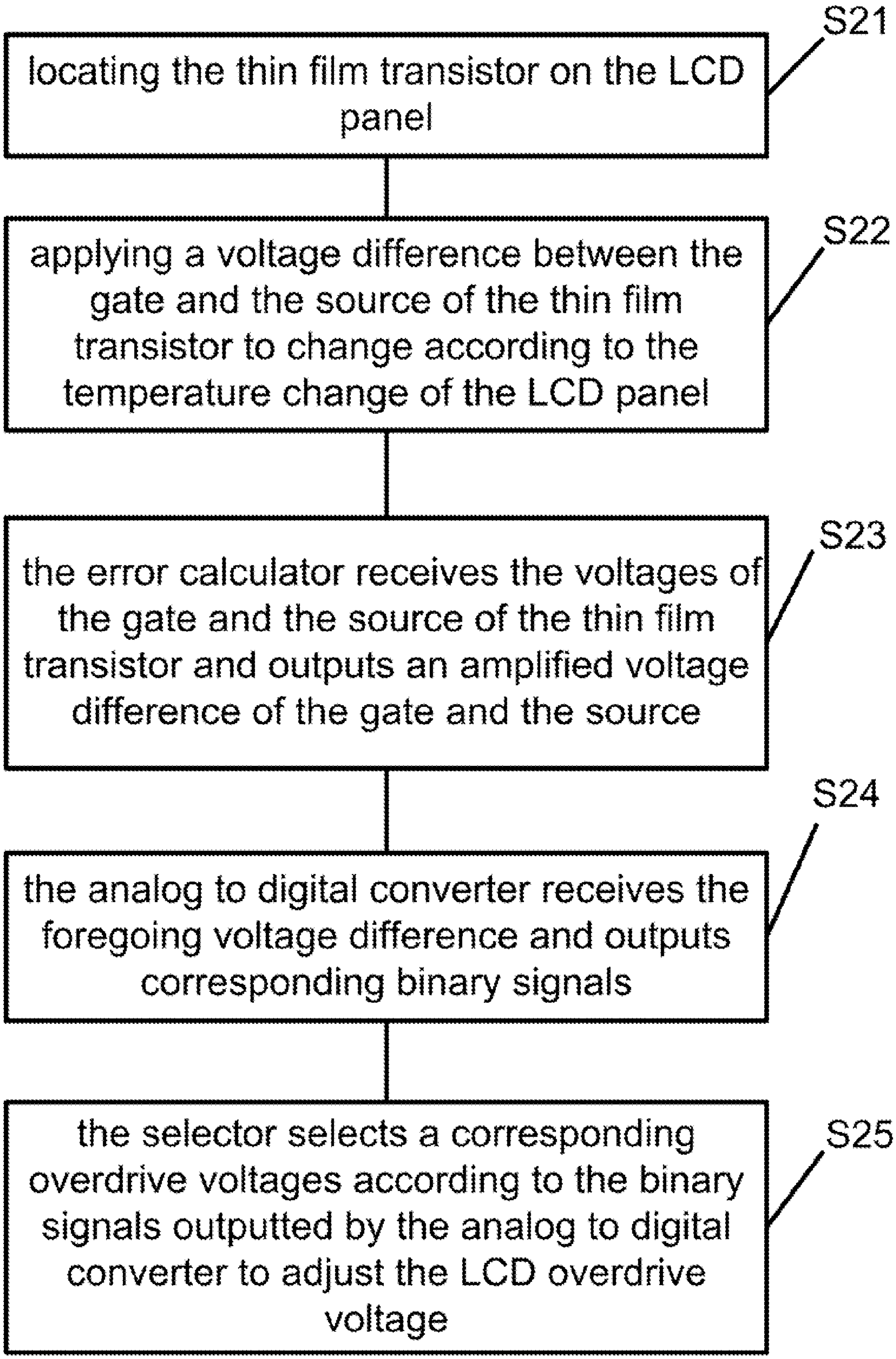
FIG. 2 shows a flowchart of the adjustment method according to a preferable embodiment of the present invention.

FIG. 2 shows a flowchart of the adjustment method according to the embodiment of the present invention. The adjustment method of the LCD overdrive voltage utilizing the aforesaid adjustment device comprises steps below: Step 21, locating the thin film transistor 11 on the LCD panel; Step 22, applying a voltage difference between the gate G and the source S of the thin film transistor 11 to change according to the temperature change of the LCD panel; Step 23, the error calculator 19 receives the voltages of the gate G and the source S of the thin film transistor 11 and outputs an amplified voltage difference of the gate G and the source S; Step 24, the analog to digital converter 12 receives the foregoing voltage difference and outputs corresponding binary signals; Step 25, the selector 13 selects a corresponding overdrive voltages according to the binary signals outputted by the analog to digital converter 12 to adjust the LCD overdrive voltage.

Please refer to the device in FIG. 1 with under respective steps.

Please refer to Step 21, locating the thin film transistor 11 on the LCD panel 10. In this step, the LCD panel 10 can be any common arbitrary LCD panel. If the temperature distribution of the LCD panel 10 is average, the thin film transistor 11 can be located on an arbitrary position on the LCD panel 10; if the temperature distribution of the LCD panel 10 is not average, a position capable of sensing an average temperature of the LCD panel 10 can be selected on actual demands.

Please refer to Step 22, applying a voltage difference between the gate G and the source S of the thin film transistor 11 to change according to the temperature change of the LCD panel. In this step, the drain D of the thin film transistor 11 receives the predetermined voltage V1 via the constant current source 15. The source S receives a reference voltage V2 and the gate G is electrically connected to the drain D. The relation of the foregoing predetermined voltage V1 and the reference voltage V2 satisfies a conducting condition of the thin film transistor 11. In the thin film transistor 11, the voltage $V_{gs}$ between the source S and the gate G is a function of temperature and can be expressed as: $V_{gs}=V_{gs0}+aT$. The $V_{gs0}$ is a voltage between the source S and the gate G at the room temperature; a is a temperature coefficient of the voltage between the source S and the gate G. Basing on the formula $\Delta V_{gs}=a\cdot\Delta T$, thereby, the voltage difference change $\Delta V_{gs}$ between the source S and the gate G of the thin film transistor 11 due to the temperature change $\Delta T$ of the LCD panel 10 can be sensed by the thin film transistor 11 and obtained. In other words, the voltage difference change $\Delta V_{gs}$ between the source S and the gate G of the thin film transistor 11 changes according to the temperature change of the LCD panel 10.

Step 23, the error calculator 19 receives the voltages of the gate G and the source S of the thin film transistor 11 and outputs an amplified voltage difference of the gate G and the source S. The foregoing variable voltage input end and the reference voltage input end of the error amplifier 19 receive the voltages of the gate G and the source S of the thin film transistor 11 respectively. The error amplifier 19 outputs the amplified voltage reference of the gate G and the source S.

Step 24, the analog to digital converter 12 receives the foregoing amplified voltage difference outputted by the error amplifier 19 and then outputs corresponding binary signals.

Step 25, the selector 13 selects a corresponding overdrive voltages according to the binary signals outputted by the analog to digital converter 12 for selecting the overdrive voltage for the LCD and adjusting the LCD overdrive voltage.

The aforementioned device and method can reveal the temperature change of the LCD panel 10 in formed by the voltage change of the gate of the thin film transistor 11 with locating the thin film transistor 11 on the LCD panel 10. Therefore, the overdrive voltages can be selected according to the voltage change of the gate of the thin film transistor 11. The test method is simple and quick. Accordingly, the temperature change of the LCD panel 10 can be revealed for adjusting the LCD overdrive voltage.

The aforementioned is merely the preferable embodiment of the present invention. The adjustment method of LCD overdrive voltage and the device thereof are not limited to the aforementioned embodiment. For example, the error amplifier 19 can be merely a error calculator as long as the accuracy of the analog to digital converter 12 can satisfy the corresponding binary signals of the voltage difference output of the gate G and the source S of the thin film transistor 11. The thin film transistor 11 also can be replaced with other transistors, such as a triode.

By locating the thin film transistor 11 on the LCD panel 10 with the aforesaid adjustment device, adjustment method and with testing the gate voltage change of representing the temperature of the LCD panel 10, the test method is simple and quick. Therefore, the temperature of the LCD panel 10 can be rapidly and accurately obtained.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. An adjustment method of an LCD (Liquid Crystal Display) overdrive voltage, wherein the adjustment method comprises steps of:

- locating a transistor at a position capable of sensing a temperature of an LCD panel;
- providing a constant current source to a drain of the transistor and a conducting voltage to the transistor, and a voltage difference between a source and a gate of the transistor changing according to the temperature change of the LCD panel;
- receiving voltages of the source and the gate of the transistor to calculate a voltage difference between the source and the gate and outputting an amplified value of the voltage difference by an error amplifier;
- receiving the amplified value of the voltage difference and outputting corresponding binary signals by an analog to digital converter;
- providing a selector of storing a plurality of overdrive voltages, and the selector selecting different overdrive voltages according to the different binary signals to adjust the LCD overdrive voltage; and
- utilizing different overdrive voltages under different temperature conditions.

2. The adjustment method of the LCD overdrive voltage of claim 1, wherein the transistor is a thin film transistor.

3. An adjustment device of an LCD (Liquid Crystal Display) overdrive voltage, wherein the adjustment device comprises:

- a transistor, an analog to digital converter, an error calculator and a selector storing a plurality of overdrive voltages, the transistor is located on an LCD panel, and a voltage difference between a source and a gate of the transistor changes according to a temperature change of the LCD panel, the error calculator receives voltages of the source and the gate of the transistor and outputs a voltage difference thereof, the analog to digital converter receives the voltage difference and outputs corresponding binary signals, the selector selects a corresponding overdrive voltage according to the binary signals to adjust the LCD overdrive voltage, and different overdrive voltages are utilized under different temperature conditions.

4. The adjustment device of the LCD overdrive voltage of claim 3, wherein the transistor is a thin film transistor.

5. The adjustment device of the LCD overdrive voltage of claim 4, wherein a source voltage of the thin film transistor remains constant and the voltage of the gate changes according to the temperature change of the LCD panel.

6. The adjustment device of the LCD overdrive voltage of claim 4, further comprising a constant current source and the source of the thin film transistor receives a reference voltage, and the gate of the thin film transistor is electrically connected to the drain thereof, and receives a predetermined voltage via the constant current source, and the relation of the predetermined voltage and the reference voltage satisfies a conducting condition of the thin film transistor.

7. The adjustment device of the LCD overdrive voltage of claim 6, wherein the reference voltage is a common voltage of the LCD panel and comes from the driving IC of the LCD.

8. The adjustment device of the LCD overdrive voltage of claim 6, wherein the predetermined voltage comes from the driving IC of the LCD.

9. The adjustment device of the LCD overdrive voltage of claim 4, further comprising an amplifier coupled between the error calculator and the analog to digital converter, and the amplifier is utilized to amplify the voltage difference between the source and the gate of the transistor and outputs the amplified value of the voltage difference to the analog to digital converter, and the amplifier and the error calculator are integrated to construct an error amplifier.

10. The adjustment device of the LCD overdrive voltage of claim 4, wherein the selector stores the plurality of overdrive voltages corresponding the binary signals outputted by the analog to digital converter.

11. The adjustment device of the LCD overdrive voltage of claim 4, wherein the thin film transistor is an N-type thin film transistor or a P-type thin film transistor.

12. The adjustment device of the LCD overdrive voltage of claim 4, wherein the thin film transistor is located at a position which a temperature thereof capable of representing an average temperature of the LCD panel.

13. An adjustment method of an LCD (Liquid Crystal Display) overdrive voltage, wherein the adjustment method comprises steps of:

locating a transistor on an LCD panel;

applying a voltage difference between a source and a gate of the transistor to change according to the temperature change of the LCD panel;

receiving voltages of the source and the gate of the transistor and outputting a voltage difference thereof by an error calculator;

receiving the voltage difference and outputting corresponding binary signals by an analog to digital converter;

providing a selector storing a plurality of overdrive voltages, selecting a corresponding overdrive voltage according to the binary signals to adjust the LCD overdrive voltage; and utilizing different overdrive voltages under different temperature conditions.

14. The adjustment method of the LCD overdrive voltage of claim 13, wherein the transistor is a thin film transistor.

15. The adjustment method of the LCD overdrive voltage of claim 14, wherein the voltage of the gate changes according to the temperature change of the LCD panel and a source voltage of the thin film transistor remains constant.

16. The adjustment method of the LCD overdrive voltage of claim 14, wherein the method comprises a step of:

providing a constant current source to the drain of the transistor and a conducting voltage to the thin film transistor in the step of applying the voltage difference between the source and the gate of the transistor to change according to the temperature change of the LCD panel.

17. The adjustment method of the LCD overdrive voltage of claim 14, wherein the method comprises a step of:

a drain receiving a predetermined voltage via a constant current source, and the source receiving a reference voltage, and the gate electrically connecting to the drain, and the relation of the predetermined voltage and the reference voltage satisfying a conducting condition of the thin film transistor in the step of applying the voltage difference between the source and the gate of the transistor to change according to the temperature change of the LCD panel.

18. The adjustment method of the LCD overdrive voltage of claim 14, further comprising a step of:

amplifying the voltage difference between the source and the gate outputted by the error calculator and outputting the amplified value of the voltage difference to the analog to digital converter, and the analog to digital converter outputs the corresponding binary signals according to the amplified value of the voltage difference.

19. The adjustment method of the LCD overdrive voltage of claim 13, further comprising:

locating the thin film transistor at a position which the temperature thereof capable of representing an average temperature of the LCD panel in the step of locating the thin film transistor on the LCD panel.

* * * * *